US006550345B1

United States Patent
Letton (10) Patent No.: US 6,550,345 B1
(45) Date of Patent: Apr. 22, 2003

(54) TECHNIQUE FOR MEASUREMENT OF GAS AND LIQUID FLOW VELOCITIES, AND LIQUID HOLDUP IN A PIPE WITH STRATIFIED FLOW

(75) Inventor: Winsor Letton, Houston, TX (US)

(73) Assignee: Daniel Industries, Inc., Houston, TX (US)

( * ) Notice: Subject to any disclaimer, the term of this patent is extended or adjusted under 35 U.S.C. 154(b) by 0 days.

(21) Appl. No.: 09/658,071

(22) Filed: Sep. 11, 2000

(51) Int. Cl.⁷ .................................................. G01F 1/66
(52) U.S. Cl. .................................................. 73/861.27
(58) Field of Search ........................ 73/861.25–861.31, 73/861.18, 602, 627, 628, 354–357, 861

(56) References Cited

U.S. PATENT DOCUMENTS

| | | | |
|---|---|---|---|
| 3,623,363 A | 11/1971 | Dory | 73/194 |
| 4,080,837 A | 3/1978 | Alexander et al. | 73/61.1 |
| 4,138,879 A | 2/1979 | Liebermann | 73/19 |
| 4,646,575 A | 3/1987 | O'Hair et al. | 73/861.31 |
| 4,763,525 A | 8/1988 | Cobb | 73/599 |
| 5,325,703 A | 7/1994 | Magori | 73/23.32 |
| 5,415,048 A | 5/1995 | Diatschenko et al. | 73/861.04 |
| 5,714,691 A | 2/1998 | Hill | 73/861.04 |
| 5,719,329 A | 2/1998 | Jepson et al. | 73/61.49 |
| 5,792,962 A | 8/1998 | Constant et al. | 73/861.04 |
| 5,929,342 A | 7/1999 | Thompson | 73/861.04 |
| 6,209,388 B1 * | 4/2001 | Letton et al. | 73/61.79 |

FOREIGN PATENT DOCUMENTS

| | | |
|---|---|---|
| EP | 0691527 | 1/1996 |
| RU | 838552 | 6/1981 |
| WO | 9314382 | 7/1993 |

OTHER PUBLICATIONS

A. D. Goolsby; Detecting Multiple Phase Flow in a Conduit; United States Statutory Invention Registration, Reg. No.: H608; Published: Mar. 7, 1989; (5 p.).

\* cited by examiner

*Primary Examiner*—Hezron Williams
*Assistant Examiner*—Charlene Dickens

(57) ABSTRACT

An ultrasonic flowmeter is disclosed that detects the speed, amount, and composition of a two-phase flow travelling through it. One or more ultrasonic paths corresponding to ultrasonic transducers are positioned to detect the velocity and speed of sound through one phase of the two-phase flow. A second ultrasonic path is positioned to travel through the one phase of the two-phase flow, but to reflect off the interface between of interface of the two phases. A third ultrasonic path is positioned to travel through the second phase of the two-phase flow, but once again reflects off the interface between the two phases. The information of transit times for ultrasonic signals along these ultrasonic paths provides the speed of the two-phase flows, the amount of the two-phase flows, and the compositions of the two-phase flows. A quality assurance check ensures that the measurements are accurate.

28 Claims, 11 Drawing Sheets

TECHNIQUE FOR MEASUREMENT OF GAS AND LIQUID FLOW VELOCITIES, AND LIQUID HOLDUP IN A PIPE WITH STRATIFIED FLOW

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

In pipeline operations and other industrial applications, flow meters must be capable of accurately measuring the flow rate of gases or liquids moving through piping or tubing systems. In natural gas pipelines, for example, these flow rate measurements may be relied upon for custody transfer, leak detection, control, or for other indications.

For custody transfer operations, the meter is the point where custody transfer occurs, such as when gas is delivered into or out of a pipeline system through the meter as it measures the passing flow rate. By accurately measuring the flow rate for a given time period, the volume of gas that passes through the meter can be determined, and a custody transfer volume ticket can then be prepared. The pipeline transportation fee is based on the volume of product moved through the system, ie. the custody transfer volume. Thus, a custody transfer metering system is commonly referred to in the pipeline industry as the "cash register," and pipeline operators take great care to maintain its measurement accuracy.

Concentric orifice meters are one type of flow meter used to measure the flow of fluid through a pipeline. More recently, ultrasonic flow meters have been introduced that use ultrasonic signals to detect the flow velocity of fluid (i.e. liquid or gas) moving through a pipeline. All flow meters, however, must accurately measure the speed of the flowing fluid.

Often the fluid stream is a gas containing a certain amount, or percent fraction, of liquid. This is referred to wet gas, or more generally, as two-phase flow. The liquid in the gas often travels in either a mist flow or a stratified flow, or as a combination of these two. In mist flow, tiny droplets of liquid disperse through and are carried along by the gaseous flow. Thus, the droplets travel at about the same speed as the gas. In stratified flow, the liquid travels in a flow or river most often. at the bottom of the pipe. In stratified flow, the liquid typically travels at a different, and usually slower, speed than the gas stream. Although not as common, the two-phase flow may be predominantly liquid with a percent fraction of gas traveling in a stratified flow at the top of the pipeline.

To determine the amount of gas and liquid flowing in the pipeline, it is necessary to determine the relative areas occupied by the gas and liquid flowing through the pipeline, the speed of the gas stream, and the speed of the liquid flow. It would also be helpful to know the composition of the gas and liquid portions. For example, if the gas contains "natural gas liquids" or condensates, a seller of gas deserves extra compensation for this energy-rich liquid. Unfortunately, however, flow meters have historically not been very good at measuring the flow rate (i.e. volume or mass flow) of both a liquid fraction and a gas fraction for wet gas flow.

Various measurements of an ultrasonic flow meter have been found to correlate to the amount of liquid travelling as a mist flow, as taught in U.S. Pat. No. 6,151,158, "Ultrasonic Fraction & Flow Apparatus & Method," Ser. No. 08/613,478, hereby incorporated by reference for all purposes without exception. However, this patent does not describe how to determine the amount of stratified flow in the pipeline, its velocity, or its composition.

A flow meter is therefore needed that is capable of measuring the amount of stratified fluid flow in a pipeline. Ideally, this flow meter could determine the flow velocity of the stratified flow as well. It would also be desirable if this flow meter could determine the composition of the stratified flow. In a perfect world, this flow meter would also measure the flow velocity of the gas flow, the area of the pipeline occupied by the gas flow, and the composition of the gas flow. It would further be desirable if this flow meter could also detect the presence of a mist flow.

SUMMARY OF THE INVENTION

A disclosed embodiment of the present invention features an ultrasonic flow meter suitable to to carry a two-phase flow having a stratified flow portion. A first path, corresponding to a first ultrasonic transducer, travels wholly through one phase of the two-phase flow. A second path, corresponding to a second ultrasonic transducer, traverses through one phase of the two-phase flow, but reflects or bounces from the interface between the gas and liquid flows. A third path, corresponding to a third ultrasonic transducer, traverses through the other phase of the two-phase flow, and also reflects or bounces from the interface between the gas and liquid flows. Each of these first, second, and third transducers generally correspond to another transducer, making at least three pairs of transducers in the flow meter.

Based on this configuration, an associated processor calculates flow velocity and speed of sound for each phase of the two-phase flow. The level of the stratified flow is also determined, as well as the average density or molecular weight of each of the phases. This provides an indication of the composition of each of these phases.

Thus, the invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

Figure 1A:
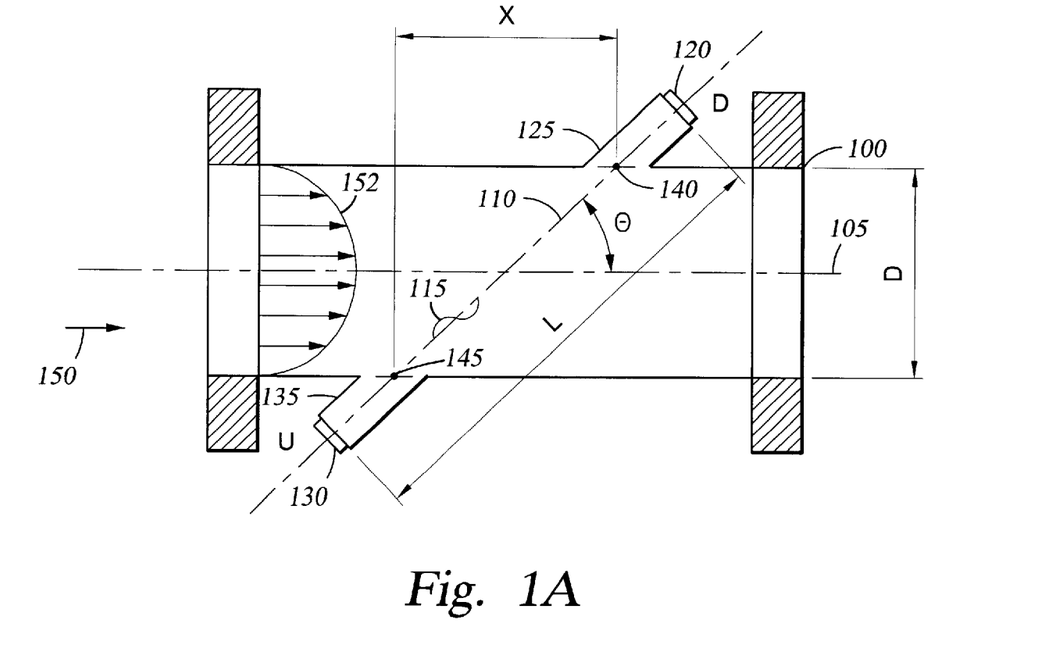
FIG. 1A is a cut-away top view of an ultrasonic flow meter.

FIG. 1A shows a known ultrasonic meter suitable for measuring gas flow, generally with a design disclosed in U.S. Pat. No. 4,646,575 (hereby incorporated by reference for all purposes). Spoolpiece 100, suitable for placement between sections of gas pipeline, has a predetermined size and thus defines a measurement section. A pair of transducers 120 and 130, and their respective housings 125 and 135, are located along the length of spoolpiece 100. A path 110, sometimes referred to as a "chord" exists between transducers 120 and 130 at an angle θ to a centerline 105. The position of transducers 120 and 130 may be defined by this angle, or may be defined by a first length L measured-between transducers 120 and 130, and a second length X corresponding to the axial distance between points 140 and 145. Distances X and L are precisely determined during meter fabrication. Points 140 and 145 define the locations where acoustic signals generated by transducers 120 and 130 enter and leave gas flowing through the spoolpiece 100 (i.e. the entrance to the spoolpiece bore). In most instances, meter transducers such as 120 and 130 are placed a specific distance from points 140 and 145, respectively, regardless of meter size (i.e. spoolpiece size). A fluid, typically natural gas, flows in a direction 150 with a velocity profile 152. Velocity vectors indicate that the gas velocity through spool piece 100 increases as centerline 105 of spoolpiece 100 is approached.

Transducers 120 and 130 are ultrasonic transceivers, meaning that they both generate and receive ultrasonic signals. Typically, these signals are generated and received by a piezoelectric element in each transducer. Ultrasonic signals can be generated at the upstream transducer and transmitted to the downstream transducer, or can be generated from the downstream transducer and transmitted to the upstream transducer. For example, D transducer 120 generates an ultrasonic signal that is then received at, and detected by, U transducer 130. Some time later, U transducer 130 generates a reciprocal ultrasonic signal that is subsequently received at and detected by D transducer 120. Thus, U and D transducers 120 and 130 play "pitch and catch" with ultrasonic signals 115 along chordal path 110. During operation, this sequence may occur thousands of times per minute.

The transit time of the ultrasonic wave 115 between transducers U 130 and D 120 depends in part upon whether the ultrasonic signal 115 is traveling upstream or downstream with respect to the flowing gas. The transit time for an ultrasonic signal traveling downstream (i.e. in the same direction as the flow) is less than its transit time when traveling upstream (i.e. against the flow). The upstream and downstream transit times can be used to calculate the gas flow's average velocity along the signal path.

In addition, ultrasonic gas flow meters can have one or more paths. Single-path meters typically include a pair of transducers that projects ultrasonic waves over a single path across the axis (ie. center) of spoolpiece 100. Utrasonic meters having more than one path, however, can give more accuracy, particularly when at least one path does not go through the axis 105 of the spoolpiece 100. Ultrasonic meters having more than one path are also fault-tolerant, meaning that even when a path of the meter fails it can keep operating. Multi-path ultrasonic meters additionally yield information on changes in gas properties, and they often provide extensive diagnostic capabilities that help determine whether the meter is operating properly. These advantages make multi-path ultrasonic meters desirable for custody transfer applications where accuracy and reliability are crucial.

Figure 1B:
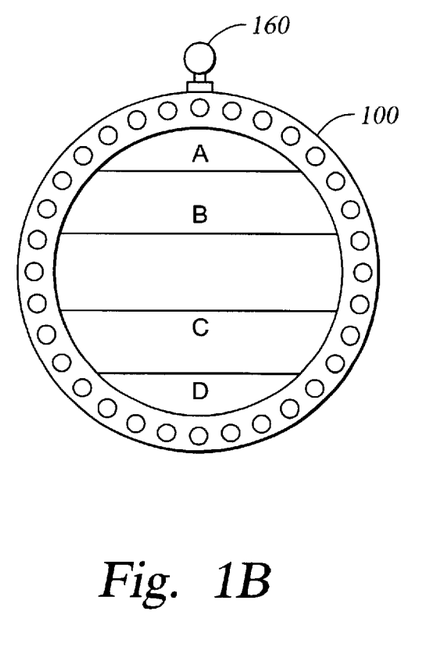
FIG. 1B is an end view of the ultrasonic flow meter of FIG. 1A.

Referring now to FIG. 1B, a multi-path ultrasonic meter is shown. Spool piece 100 includes four chordal paths A, B, C, and D at varying levels through the gas flow. Each chordal path A–D corresponds to two transceivers behaving alternately as a transmitter and receiver. Also shown is an electronics module 160, which acquires and processes the data from the four chordal paths A–D. Hidden from view in FIG. 1B are the four pairs of transducers that correspond to chordal paths A–D.

Figure 1C:
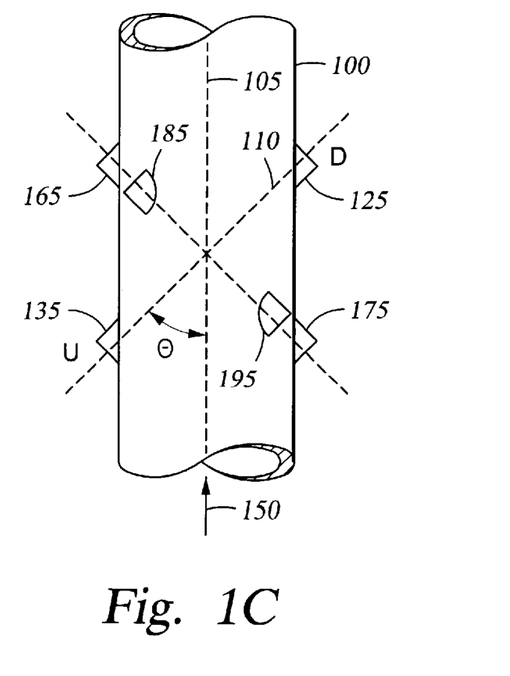
FIG. 1C is a top view of the ultrasonic flow meter of FIG. 1A.

The precise arrangement of the four pairs of transducers may be more easily understood by reference to FIG. 1C. Four pairs of transducer housings are mounted on spool piece 100. Each of these pairs of transducer housings corresponds to a single chordal path of FIG. 1B. A first pair of transducer housings 125 and 135 including transducers 120 and 130 is mounted at a non-perpendicular angle θ to centerline 105 of spool piece 100. Another pair of transducer housings 165 and 175 including associated transducers is mounted so that its chordal path loosely forms an "X" with respect to the chordal path of transducer housings 125 and 135. Similarly, transducer housings 185 and 195 are placed parallel to transducer housings 165 and 175 but at a different "level" (i.e. a different radial position in the pipe or meter spoolpiece). Not explicitly shown in FIG. 1C is a fourth pair of transducers and transducer housings. Taking FIGS. 1B and 1C together, the pairs of transducers are arranged such that the upper two pairs of transducers corresponding to chords A and B form an X and the lower two pairs of transducers corresponding to chords C and D also form an X.

A simple equation yields the average velocity of a gas over the measurement path. For example, referring back to FIG. 1A, if transducer 130 is defined as the "U" transducer and transducer 120 is defined as the "D" transducer, then:

$$V_m = \frac{L^2}{2X} \cdot \frac{t_{du} - t_{ud}}{(t_{ud})(t_{du})} \qquad (1)$$

Where, $V_m$=mean chordal velocity of the flowing gas

L=distance between transducers U and D

X=axial distance between U and D within the bore $t_{ud}$=transit time from transducer U to transducer D $t_{du}$=transit time from transducer D to transducer U Referring now to FIG. 1B, this same equation may be applied to each chord A–D to obtain each chordal flow velocity. To obtain an average flow velocity over the entire pipe, the chordal flow velocities are multiplied by a set of predetermined constants, known as weighting factors. For instance, velocity measurements at outer chords A and D may be multiplied by 0.1382, and velocity measurements at inner chords B and C may be multiplied by 0.3618. These constants are well known and were determined theoretically. It should be noted that equation (1) is exemplary only and other forms of the equation may be used.

Because the shown multi-path design continuously monitors four average chordal velocities at different levels within the gas flow, accuracy is increased as compared to single-path meter designs. For example, even without a flow calibration, the depicted meter is accurate to about 1%. In addition, because the equations are valid for gas flowing in either direction, the meter is inherently bi-directional. Further, because the flow rate equation contains only the physical dimensions of the meter body and the transit times, it does not include the speed of sound in the flowing gas. Therefore, the measurement of gas speed is independent of the factors that affect the speed of sound in gas (i.e., temperature, pressure, and composition).

Other characteristics of the fluid stream can also be simply derived. For example, as a general matter the speed of sound is related to the length of travel across a medium by an ultrasonic wave and its time of travel as:

$$C = L/t \qquad (2)$$

Where,

C=speed of sound of fluid in still condition;

L=distance between transducers U and D; and t=time of travel for an ultrasonic wave in a non-moving medium.

In the case of the ultrasonic meter, the measured speed of sound of the fluid for any particular chord is:

$$C = L(t_{ud}+t_{du})/2(t_{ud})(t_{du}) \qquad (3)$$

Where,

C=speed of sound of fluid in still condition;

L=distance between transducers U and D;

$t_{ud}$=transit time from transducer U to transducer D; and $t_{du}$=transit time from transducer D to transducer U.

However, this ultrasonic flow meter of FIGS. 1A–1C was generally not considered capable of detecting the flow rate or composition of stratified flow. It therefore was inaccurate in measuring gas flow when stratified flow of a liquid was present.

The disclosed embodiments of the invention each confront the problems of two-phase flow. As an initial matter, the arrangement of FIG. 1 can be used as a cut-off switch to determine stratified flow level. Upon the stratified flow reaching about 5% of the total volume of the spoolpiece, it occupies the space used by chord D. As such, chord D ceases to operate and stops providing information transmitted and received ultrasonic signals.

Figure 2:
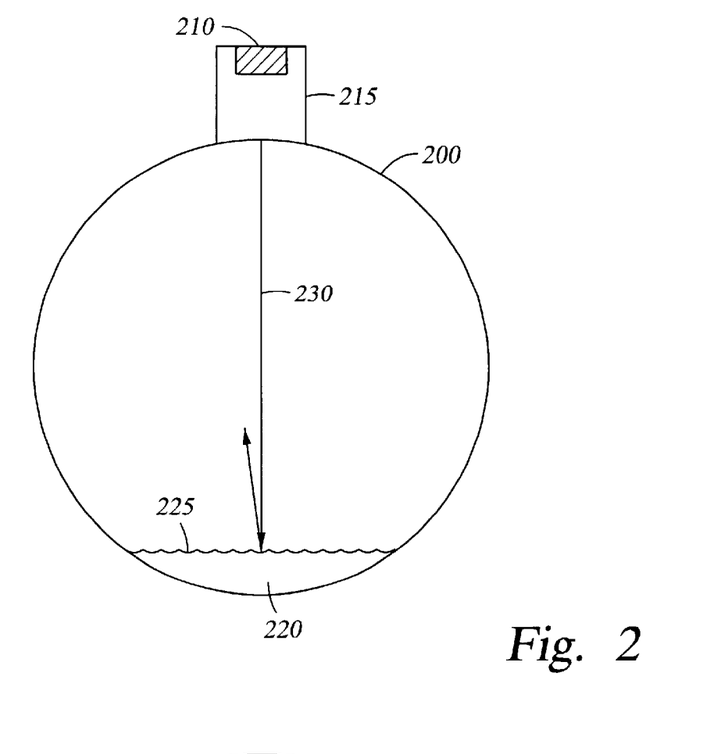
FIG. 2 is a single transducer stratified level detector.

FIG. 2 shows a single transducer embodiment to determine the level of stratified flow in a pipeline or spoolpiece. Transducer 210 is connected to spoolpiece 200 by port 215. As shown, transducer 210 is at the top of the spoolpiece. Spoolpiece 200 also caries a stratified flow 220 of liquid with a surface 225. Transducer 210 generates a signal 230 that travels across the spoolpiece 200, reflects off of the surface 225 of stratified flow 220, and returns to transducer 210. Thus, the travel time of ultrasonic signal 230 corresponds to the depth of stratified flow 220. Given the dimensions of spoolpiece or pipeline 200, the cross-sectional area of liquid traveling in a stratified flow may then be determined by a knowledge of the travel time for an ultrasonic signal to travel across a pipeline without a stratified flow and the measured travel time. It should be noted that although the term gas flow or stratified flow or the like used below suggests only a single phase flow, these flows may also include some percent of a second phase travelling in the form of, e.g, a mist flow.

Knowledge of the level of the stratified liquid flow can be helpful in a variety of ways. First, the area of the pipeline occupied by a stratified flow is area that is not carrying gas. Because calculations of the amount of gas flowing through a pipeline depend in part on assumptions about the cross-sectional area of the pipeline, knowledge of the depth of the stratified flow can be used to adjust the measurement of the cross-sectional area being used to carry the flow of gas. This improves the measurement for the volume of gas flowing through the pipeline. Second, if the speed of the stratified flow can be established, knowledge of the cross-sectional area of the stratified flow can be used to calculate the volume of stratified liquid flowing through the pipeline.

Figure 3:
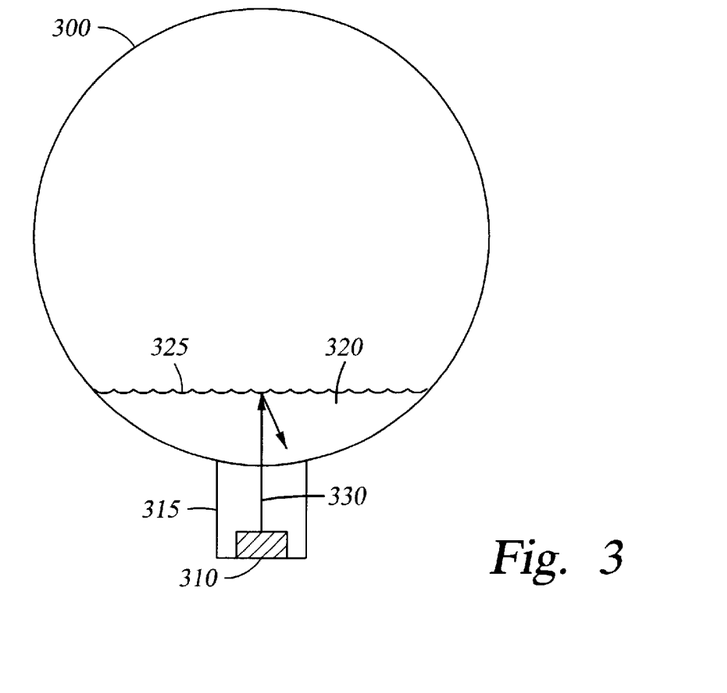
FIG. 3 is an alternate single transducer stratified level detector.

FIG. 3 shows an alternate embodiment to that shown in FIG. 2. A transducer 310 is coupled to the bottom of spoolpiece 300. A stratified flow of liquid 320 including surface 325 resides in the bottom of spoolpiece 300. Transducer 310 couples to the exterior of spoolpiece 300. The transducer 310 may couple to the bottom of the spoolpiece 300 by being a wetted transducer open to the stratified flow on the bottom of the spoolpiece 300. In this case, the ultrasonic transducer 310 at the bottom of the pipeline would be designed for liquid operation, and would only be capable of injecting a signal if liquid were present. This in itself would provide an indication of liquid presence (i.e. a muliphase flow regime). Alternately, an ultrasonic transducer may be clamped onto the outside of the steel spoolpiece.

Just as the gas-borne signal of FIG. 2 reflects off the liquid-gas interface to measure the amount of stratified flow in the pipeline, a signal 330 generated by transducer 310 travels through the stratified flow 320 before reflecting from the surface 325 of stratified flow 320. It then returns to transducer 310. The time between generation and reception of ultrasonic signal 330 may be used to determine the depth of stratified flow 320. Like the embodiment of FIG. 2, the level measurement device of FIG. 3 employs a single transducer to determine the level of stratified flow in a pipeline or spoolpiece. However, unlike the embodiment of FIG. 2, the measurement device of FIG. 3 couples to the bottom of spoolpiece or pipeline 300, and the ultrasonic signal travels through the stratified flow.

Figure 4:
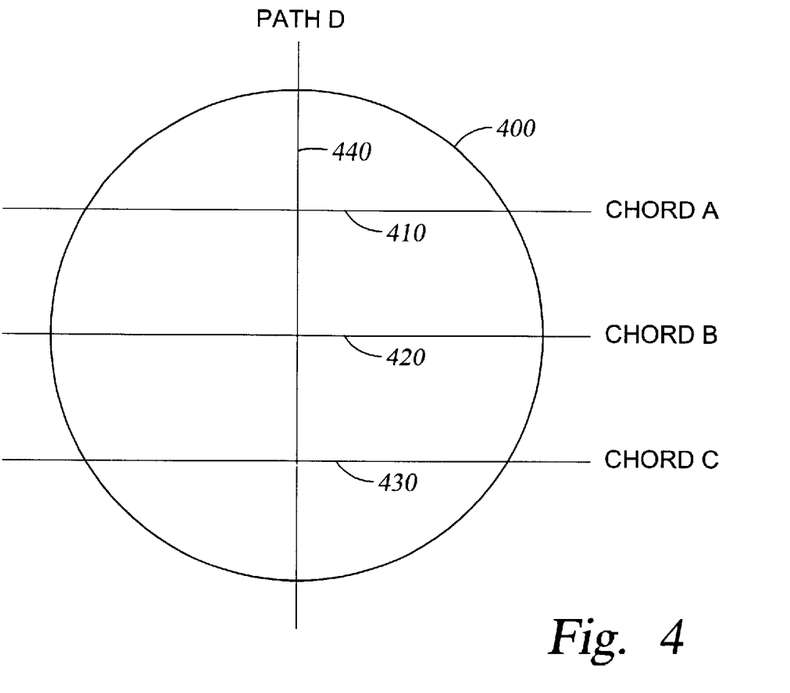
FIG. 4 is an end view of a multi-transducer stratified level detector.

FIG. 4 includes the end-view of a pipeline or spoolpiece 400 for a multiple transducer level detector. As used herein, the term pipeline shall refer to either an actual pipeline or to a spoolpiece. Three ultrasonic paths 410, 420, 430 (corresponding to a multi-path ultrasonic meter) are shown and are labeled as chords A, B, and C. Path D, labeled 440, is also shown and corresponds to an additional, vertical ultrasonic path. Of course, the transducers corresponding to path D may be positioned somewhere other than true vertical, so long as the length of path D changes with changes in stratified fluid (for example, a bounce path). Ultrasonic path D therefore may be the fourth chord of a four-chord ultrasonic meter, or may be used separately but in conjunction with an ultrasonic flow meter (or other device to measure the speed of sound in the gas) to establish the level of stratified flow. Use of a four-ultrasonic path ultrasonic-meter is exemplary only and the disclosed multiple transducer level detector could be used with or be part of any multiple chord ultrasonic meter, including a meter having bounce paths. Nonetheless, use of a three horizontal chord design in conjunction with the disclosed level detector (or integrating the design into a four-ultrasonic path meter) has certain advantages over the use of a traditional four horizontal-chord design. For example, the lowest chord on the 4 chordal path meter is easily flooded in stratified flow. An ultrasonic meter having three horizontal chords does not have a chord this low, and thus avoids this problem for the most part. As already stated, the ultrasonic transducers corresponding to path D can be either separate from, or a part of, such an ultrasonic meter. For these purposes, a level detector and an ultrasonic meter are thought of as two different devices that operate together to achieve a synergistic effect, but in actuality these two devices may equally be part of the same device and share components such as electronics, etc.

Figure 5:
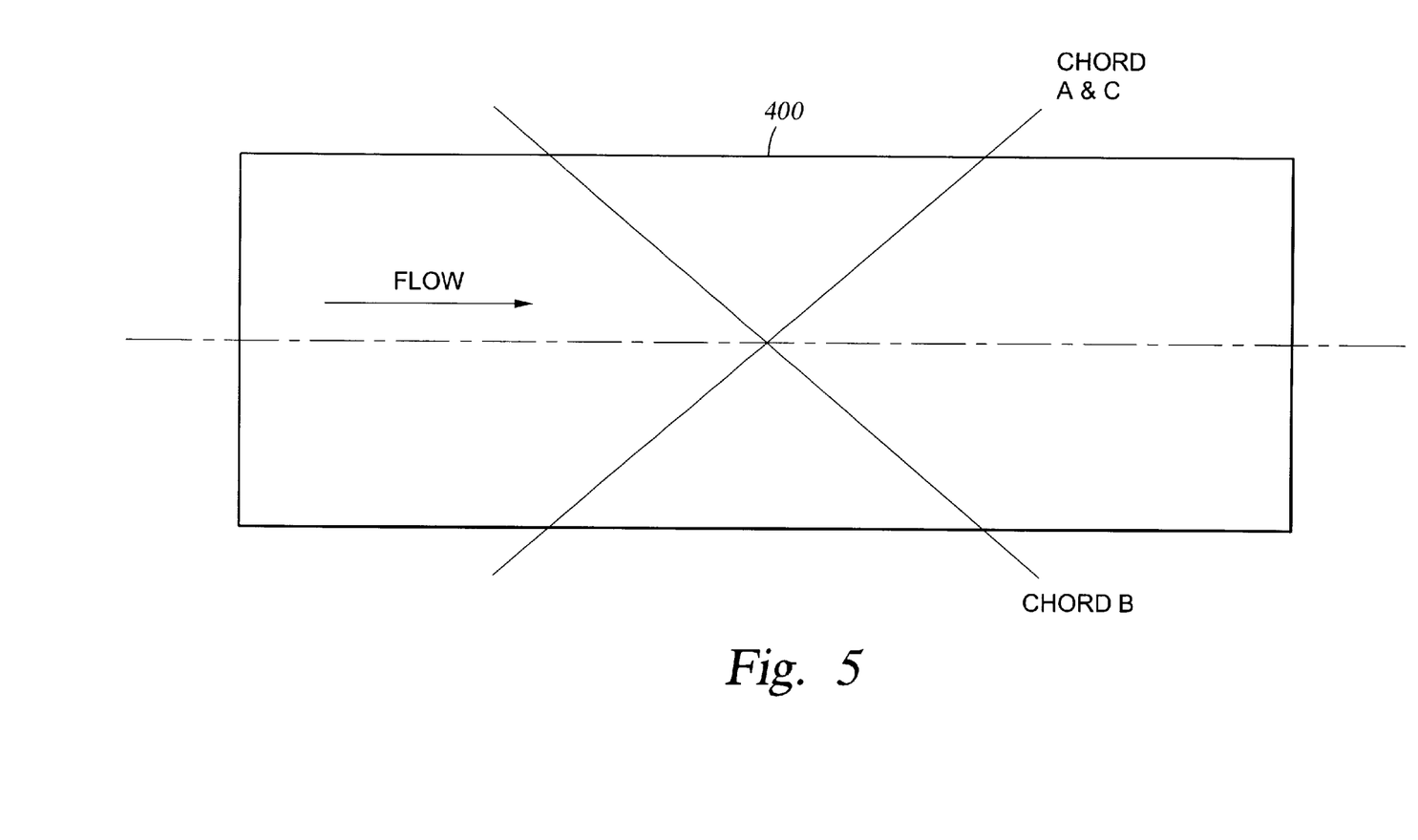
FIG. 5 is a top view of a multi-transducer stratified level detector.
Figure 6:
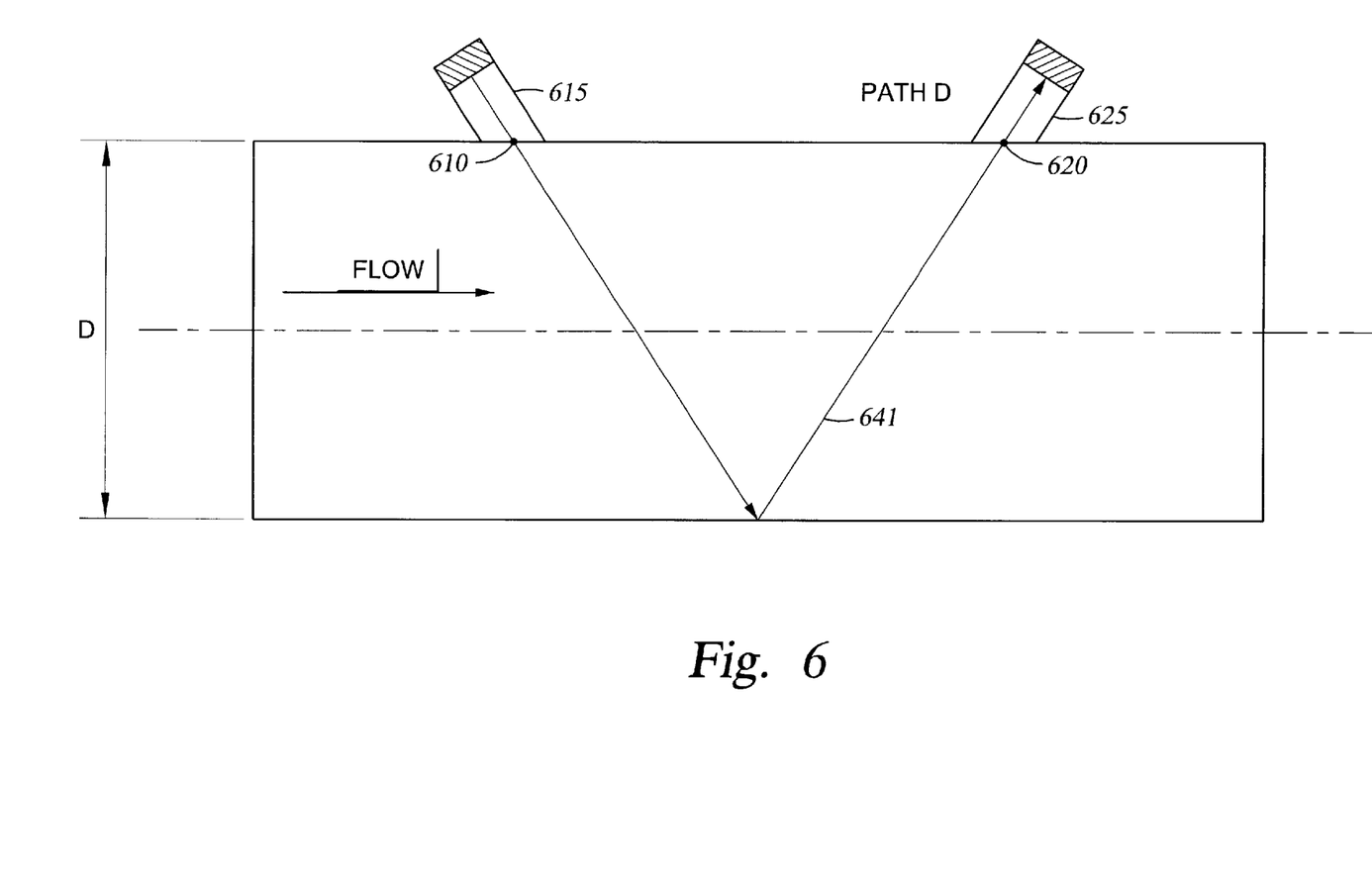
FIG. 6 is a side view of a multi-transducer stratified level detector with no stratified flow.

FIG. 5 shows the pipeline 400 from a top perspective and identifies a direction of flow, as well as ultrasonic paths A, B, and C. FIG. 6 is a side view of the flow meter of FIG. 5 showing pipeline 400 when the pipeline is carrying a one-phase gas flow. Path D originates at point 610 corresponding to an ultrasonic transducer 615, reflects off of the bottom 630 of pipeline 400 and travels to point 620 corresponding to ultrasonic transducer 625. The transducers 615 and 625 are preferably angled at about 60 degrees, although this is not a requirement of the invention. During operation transducers 615 and 625 preferably each generate ultrasonic signals that travel along path D and are detected by the other transducer, resulting in both an upstream and a downstream measurement. The measurement of both the upstream and downstream times of flight yields a speed of sound measurement for ultrasonic path D.

Figure 7:
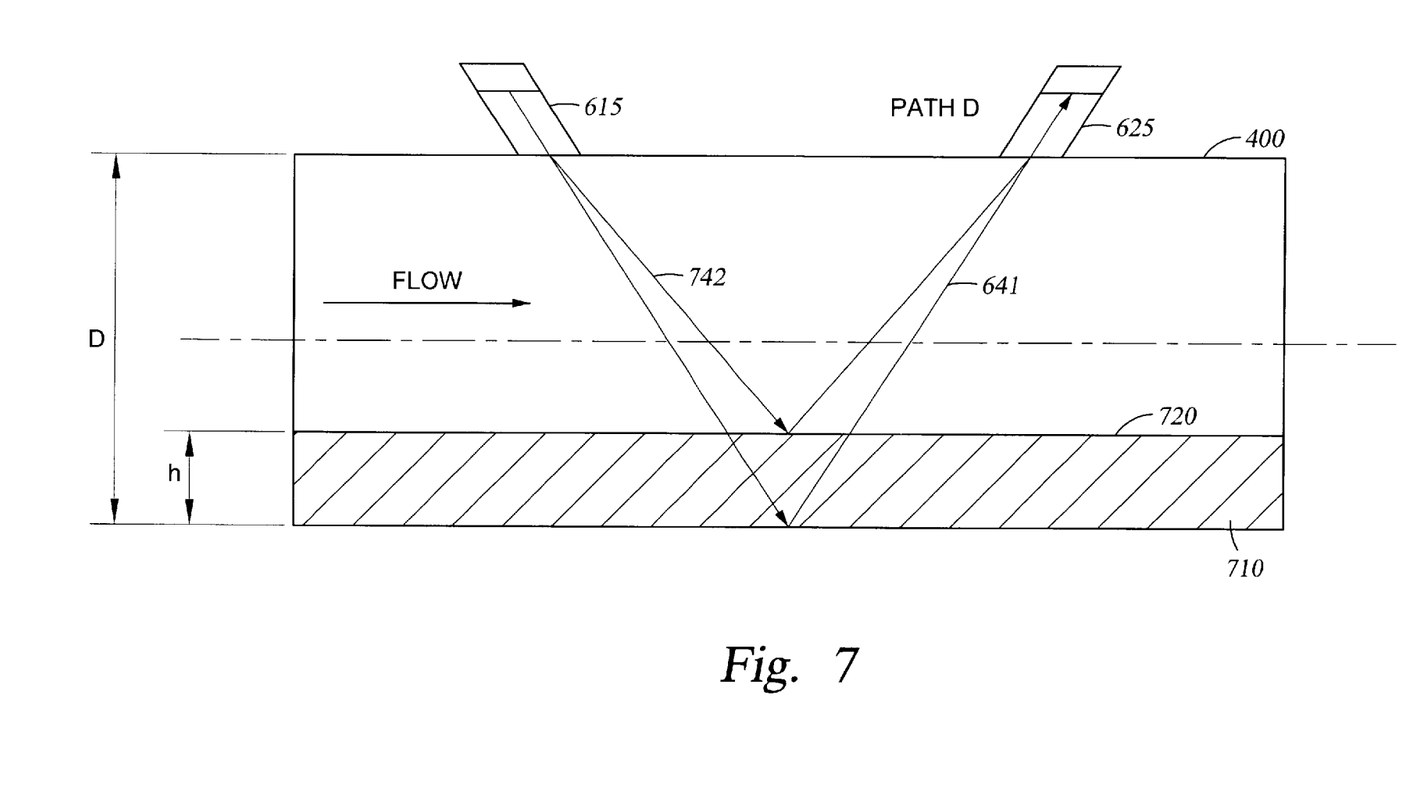
FIG. 7 is a side view of a multi-transducer stratified level detector with stratified flow.

FIG. 7 shows a side view of a pipeline 400 containing a stratified flow 710 of depth "h". Pipeline 400 includes ultrasonic transducers 615 and 625 that generate ultrasonic signals that travel along a first path D 641. First D path 641 corresponds to a pipeline without stratified flow as shown in FIG. 6. Second path D 742 corresponds to the travel path for an ultrasonic signal in a pipeline with a stratified flow. In particular, second path D 742 corresponds to an ultrasonic signal from ultrasonic transducer 615, that reflects off the surface 720 of stratified flow 710, and that travels to ultrasonic transducer 625. It is notable that the second path D 2042 will be shorter than the first path D 2041 depending upon the level of the stratified flow.

This variation in path length is used to establish the level of the stratified flow. Because these level variations are often slight, it is preferable to utilize a measurement very sensitive to these changes in path length. Once the measurements indicate that stratified flow is present, the level, volume, flow amount, etc., of the stratified flow can be found.

It has been found t hat the level of the stratified flow should result in a significant effect on a speed of sound measurement along ultrasonic path D. In a natural gas pipeline the pressure, temperature, and gas composition are variable, making the speed of sound generally unknown. Thus, the speed of sound measurement by an ultrasonic meter is highly desirable. This measurement is made in addition to measuring the velocity of the gas flow along the ultrasonic paths of an ultrasonic meter (such as an ultrasonic meter having ultrasonic paths 410, 420, 430).

When there is no liquid in the bottom of the pipeline, the speed of sound measured along path D will be the same as the speed of sound measured from the other ultrasonic paths in the ultrasonic meter. With liquid in the bottom of the pipe, however, the reflection is from the liquid surface (not the bottom of the pipe) and path D is shorter. This makes the transit time shorter and the calculated speed of sound (using the wrong path length) higher. The difference between the speed of sound measured by ultrasonic paths A, B, and C and the speed of sound measured by ultrasonic path D can be used to establish the level of stratified flow in pipeline 2000.

Figure 8:
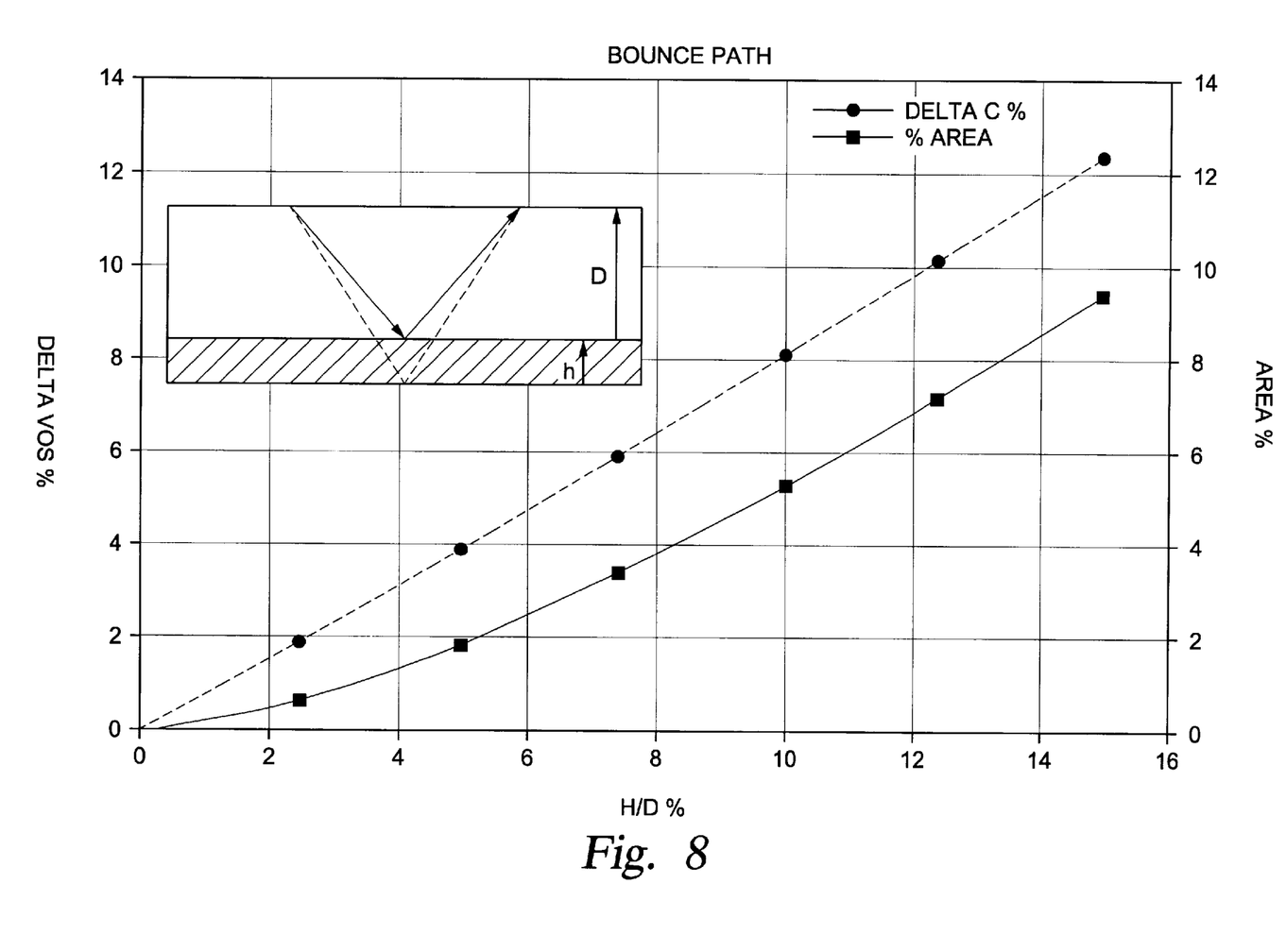
FIG. 8 is a graph showing changes in speed of sound and area versus the height/diameter of the pipeline.
Figure 9:
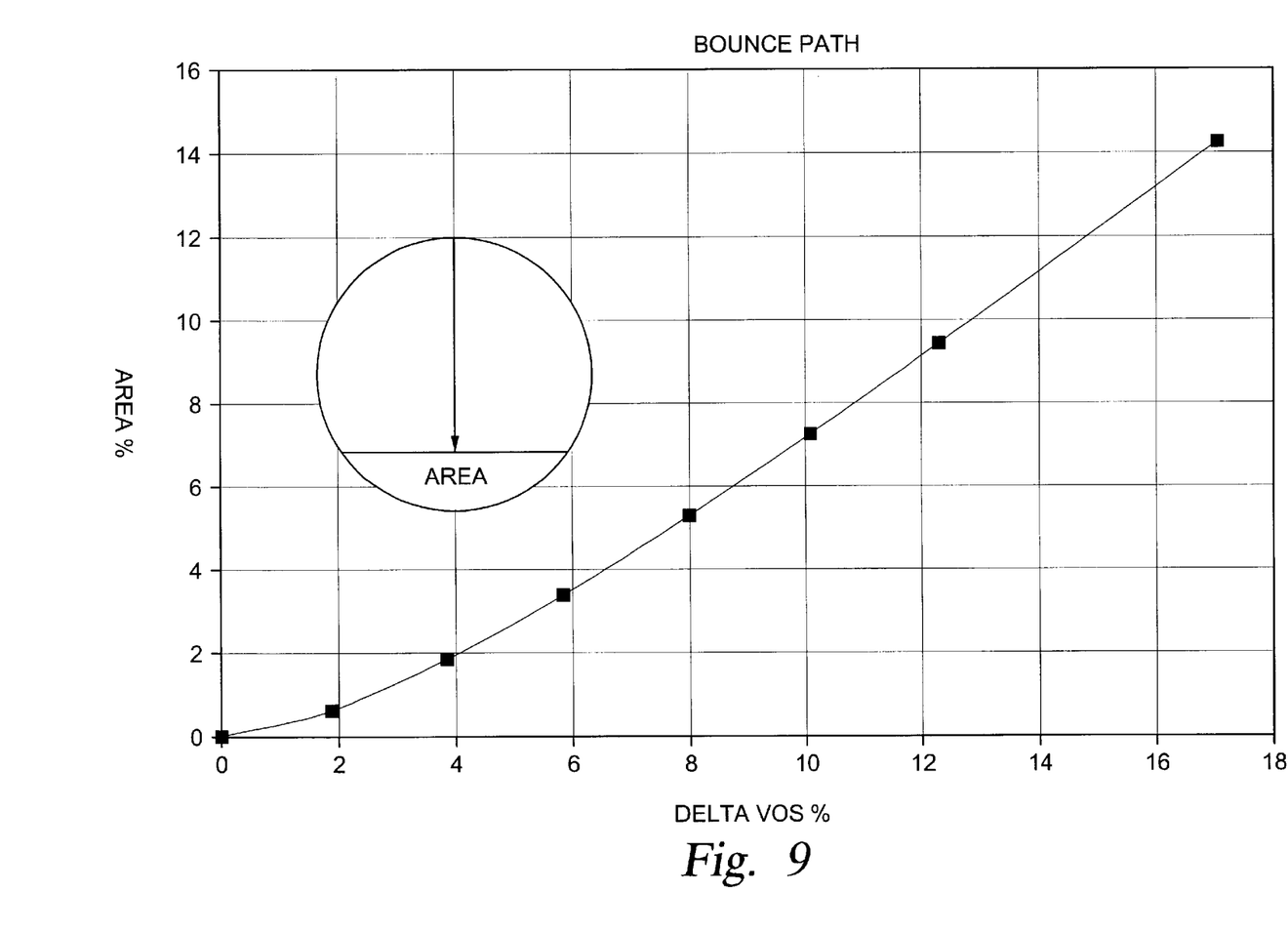
FIG. 9 is a graph showing changes in speed of sound versus changes in area occupied by a stratified flow.

Referring to FIG. 8, calculations show the effect of h/D (with h=depth of stratified flow and D=pipe diameter) on the change in speed of sound (DeltaVOS) and the area occupied by the liquid as a percent of the total pipe area. The sensitivity of speed of sound to changes in the area occupied by the stratified flow can be seen in FIG. 9. As can be seen, a 5% change in area is accompanied by an 8% change in the speed of sound, giving a very sensitive measurement. This provides an accurate measurement of the area and height occupied by stratified flow.

Figure 10:
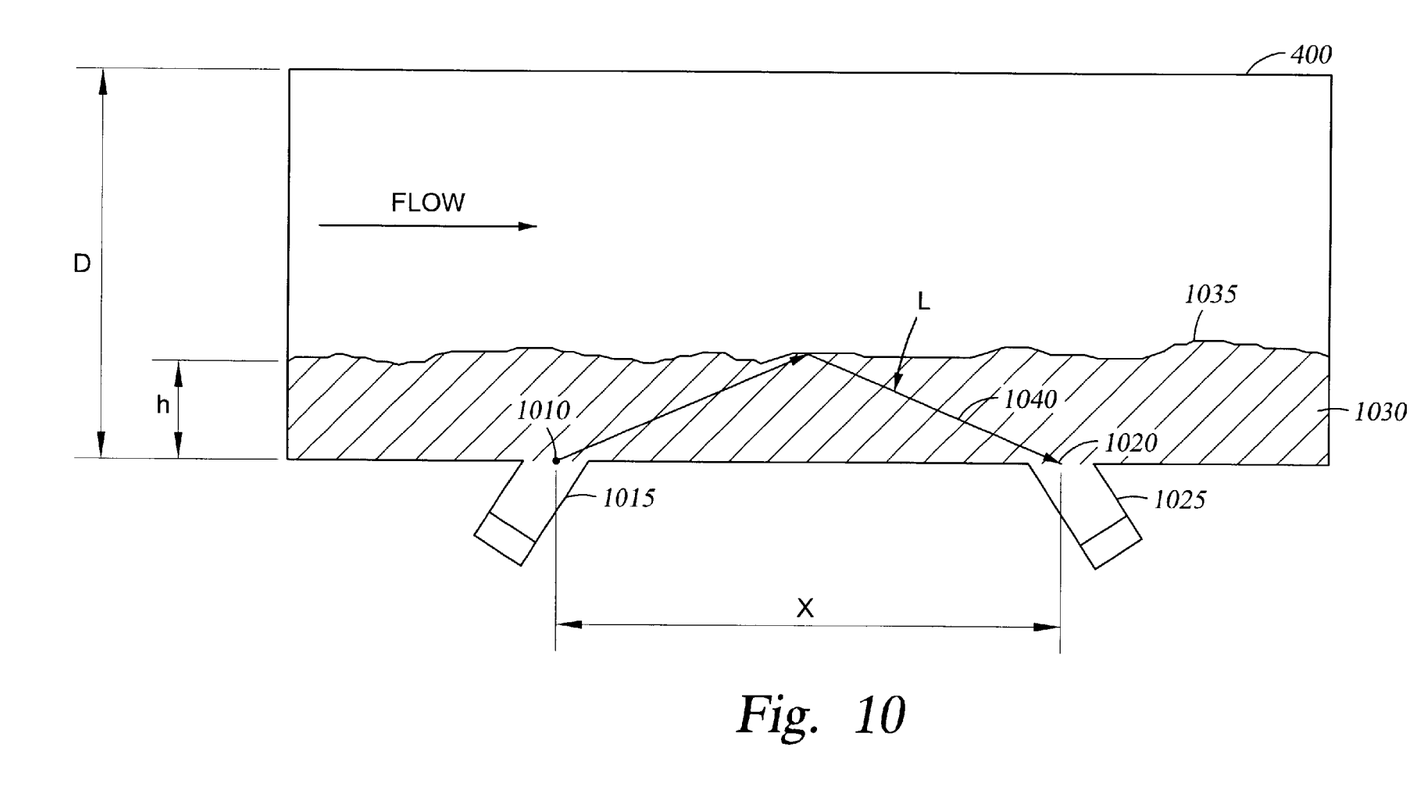
FIG. 10 is a side view of a multi-transducer stratified level detector.

A pair of transducers may also be located below the surface of the stratified flow as shown in FIG. 10. Pipeline 400 containing a stratified flow 1030 of depth "h". Pipeline 400 includes liquid ultrasonic transducers 1015 and 1025. Ultrasonic signals travel along a path 1040 from transducer 1015 through stratified flow 1030, reflect off the liquid-gas interface 1035, and to ultrasonic transducer 1025.

Transducer 1015 and 1025 are liquid transducers designed for liquid operation, and would be capable of injecting a signal only if liquid were present. This in itself would provide an indication of liquid presence in a multiphase flow regime. As the height of the liquid in the pipe, h, may be quite small, what may occur is that the liquid volume simply acts as a wave guide between the liquid-transducers, so that the traditional X and L dimensions are very nearly the same.

Figure 11:
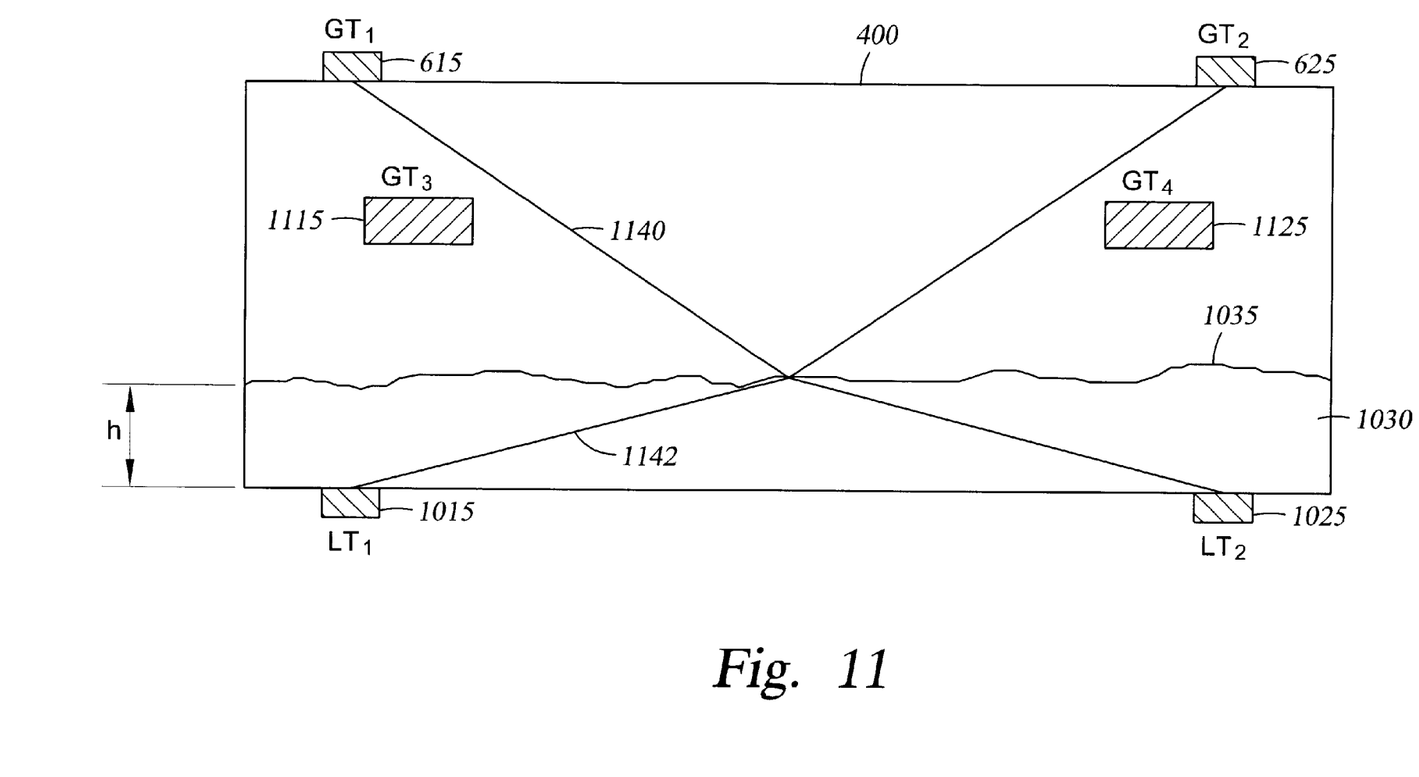
FIG. 11 is a side view of a multi-transducer two-phase flow meter.
Figure 12:
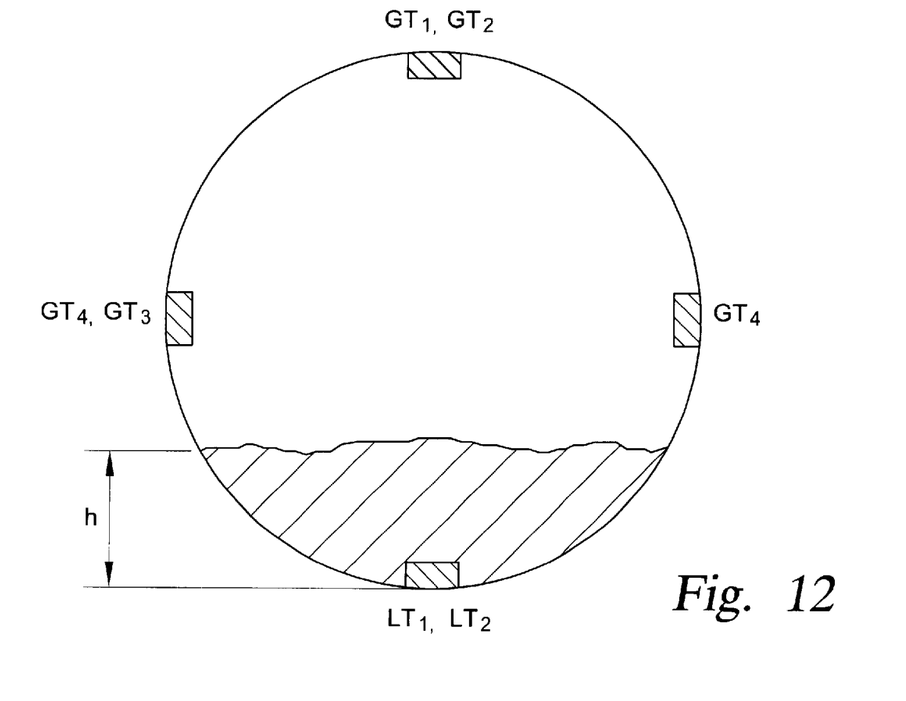
FIG. 12 is an end view of a multi-transducer two-phase flow meter.

Referring to FIG. 11 and FIG. 12, pipeline 400 includes a stratified flow of liquid 1030 of height "h," a pair of gas ultrasonic transducers 615, 625 situated to reflect a first ultrasonic signal 1140 off the gas-liquid interface 1035. One or more additional pairs of ultrasonic transducers 1115, 1125 are positioned in conventional locations to measure the velocity and speed of sound for the flowing gas. As shown, transducers 1115, 1125 are positioned to create a bounce path for corresponding ultrasonic signals, but it is to be understood that the transducers may be of any suitable positioning.

A pair of liquid transducers 1015, 1025 are positioned to reflect a second ultrasonic signal 1142 off the gas-liquid boundary 1035. The ultrasonic sensors 1015, 1025 at the bottom of the pipeline would be designed for liquid operation, and would only be capable of injecting a signal if liquid were present. As the height of the liquid in the pipe, h, may be small, the liquid may act as a wave guide between the liquid transducers, so that the traditional X and L dimensions are very nearly the same. But regardless, just as the gas-borne signal 1140 reflects off the liquid interface 1035 to measure gas velocity and holdup, the signals 1142 in the liquid 1030 between the pair of liquid ultrasonic transducers can be used to measure liquid velocity if X and L are known.

If X and L are not nearly the same, the distance "L" may be calculated from a known distance "X" between the transducers (as depicted in FIG. 10) and the calculated height "h" of the liquid. In particular, the ultrasonic path length L can be determined from:

$$L = 2\sqrt{(X/2)^2 + h^2} \qquad (4)$$

Where,
L=the ultrasonic path distance between two transducers;
X=the straight distance between two transducers; and
h=the height or depth of the second phase in the fluid flow.

The one or more pairs of ultrasonic transducers 1115, 1125 measure the velocity and (actual) speed of sound of the gaseous portion of the two-phase flow, as explained above with regard to equations (1)–(3). Transducers 615, 625 also make a speed of sound measurement. If there is stratified flow in the pipeline the speed of sound measurement for gas transducers 615, 625 will differ from that taken by transducers 1115, 1125 as explained above with respect to FIGS. 6-9. This discrepancy in measurements provides an indication of fluid level for the stratified flow 1030.

The measured speed of sound from the transducers 1115, 1125 also provides an indication of the composition of the gas phase. The measured speed of sound from transducers 1015, 1025 gives an indication of the composition of the liquid phase. In particular, the speed of sound through a substance correlates to the density of the substance, and to its molecular weight. As a standard part of the ultrasonic flow meter, pressure and temperature are measured to convert the actual volume of fluid flow to a standard volume. This same pressure and temperature information can be used to reduce the speed of sound to reference conditions, with any change in speed of sound then correlating to changes in gas composition.

The speed of sound relates to the density of a gas, liquid or solid as:

$$SOS = \left(\frac{dp}{d\rho}\right)^{1/2} \quad (5)$$

Where
SOS=speed of sound;
p=pressure;
ρ=density; and $\frac{dp}{d\rho}$ = change in pressure/change in density.

For gas, this means that the speed of sound relates to the molecular weight of the gas as:

$$SOS=(k*R*T/MW)^{1/2} \quad (6)$$

Where
SOS=speed of sound;
ck=ratio of specific heats;
R=universal gas constant;
T=absolute temperature;
MW=average molecular weight.
For a liquid, this means that:

$$SOS = \left(\frac{K}{\rho}\right)^{1/2} \quad (7)$$

Where,
K=bulk modulus; and
ρ=density of the liquid.

The intended gas flow is normally natural gas, for which the speed of sound is generally known. The main constituents of natural gas are typically 80–100% Methane (CH4), 0–10% Ethane (C2H6), and some small amounts of higher molecular weight hydrocarbons. If a substantial amount of high molecular weight gasses are present, the speed of sound measurement will change for all the ultrasonic paths traveling through the gas portion of the flow, and thus the presence of these gasses can be detected. In fact, if the type of impurity can be known in advance or otherwise measured, the change in speed of sound will reflect the amount of impurity in the gas flow. Such a feature is expected to be of great desirability to buyers and sellers of gas and hydrocarbons, who are keenly interested in what is flowing through the pipelines.

With knowledge of the level of the stratified flow, the velocity of the gas, and the diameter of the pipeline, the amount of gas flow can be calculated. With knowledge of the composition of the gas, a price for the gas flow can be set.

Similarly, knowing X and L from the determined level of stratified flow, the ultrasonic signal transit times measured by transducers 1015, 1025 provide a measurement of stratified flow velocity and the speed of sound through the stratified flow in accordance with equations (1)–(3). The level of the stratified flow provides the amount of pipeline area occupied by stratified flow. This knowledge, combined with the velocity of the stratified flow, yields the actual volume flow of the stratified liquid travelling through the pipeline. The speed of sound measurement reflects the composition of the stratified flow. For example, condensate in the pipeline are light hydrocarbons such as pentane and hexane. This gives condensate with a relative density of about 0.6, and a speed of sound of 1200 m/sec. A significant portion of water, having a relative density of about 1.0 and a speed of sound of about 1500 m/sec, alters the speed of sound measurement and provide an indication of the amount of water in the condensate by a simple mathematical means within the skill of one of ordinary skill in the art. From this information, the mass of fluid flow may be determined. The mass of a substance is equal to its volume multiplied by its density.

If desired, additional transducers may be added to take other transit time measurements through either the liquid or gas portions of the two-phase flow for comparison purposes. If a minimum number of transducers are to be employed, the assumption can be made that changes in speed of sound correlate to changes in the composition of the flow being measured.

As a quality assurance check, the speed of liquid can be calculated according to the square root of the ratio of the densities of the fluids (ie. gaseous and liquid) times the speed of the gas. This relationship can be derived because in equilibrium the shear stress on the gas-liquid interface must be the same regardless whether viewed from the gas or liquid side of the interface. Consequently, $$\rho_L V_L^2 = \rho_G [V_G - V_L]^2 \quad (8)$$

Where,
$\rho_L$=density of the liquid
$\rho_G$=density of the gas
$V_L$=velocity of liquid
$V_G$=velocity of gas This means that, $$V_L = \frac{V_G}{1+\sqrt{\frac{\rho_L}{\rho_G}}} \qquad (9)$$

Other forms of this equation may also be used.

Where the density and velocity of the gas is known (e.g. natural gas), and the density of the liquid is also known (e.g. condensate), it is possible to calculate the velocity of the liquid portion. The calculated liquid velocity from equation (9) should reasonably agree with the measured velocity of the liquid flow. It should be noted, of course, that because equation (9) is based on an equilibrium between the gas and the liquid, there should not be disruptions or disturbances to the fluid flows a short distance upstream of the flow meter if this quality assurance check is to be used.

Figure 13:
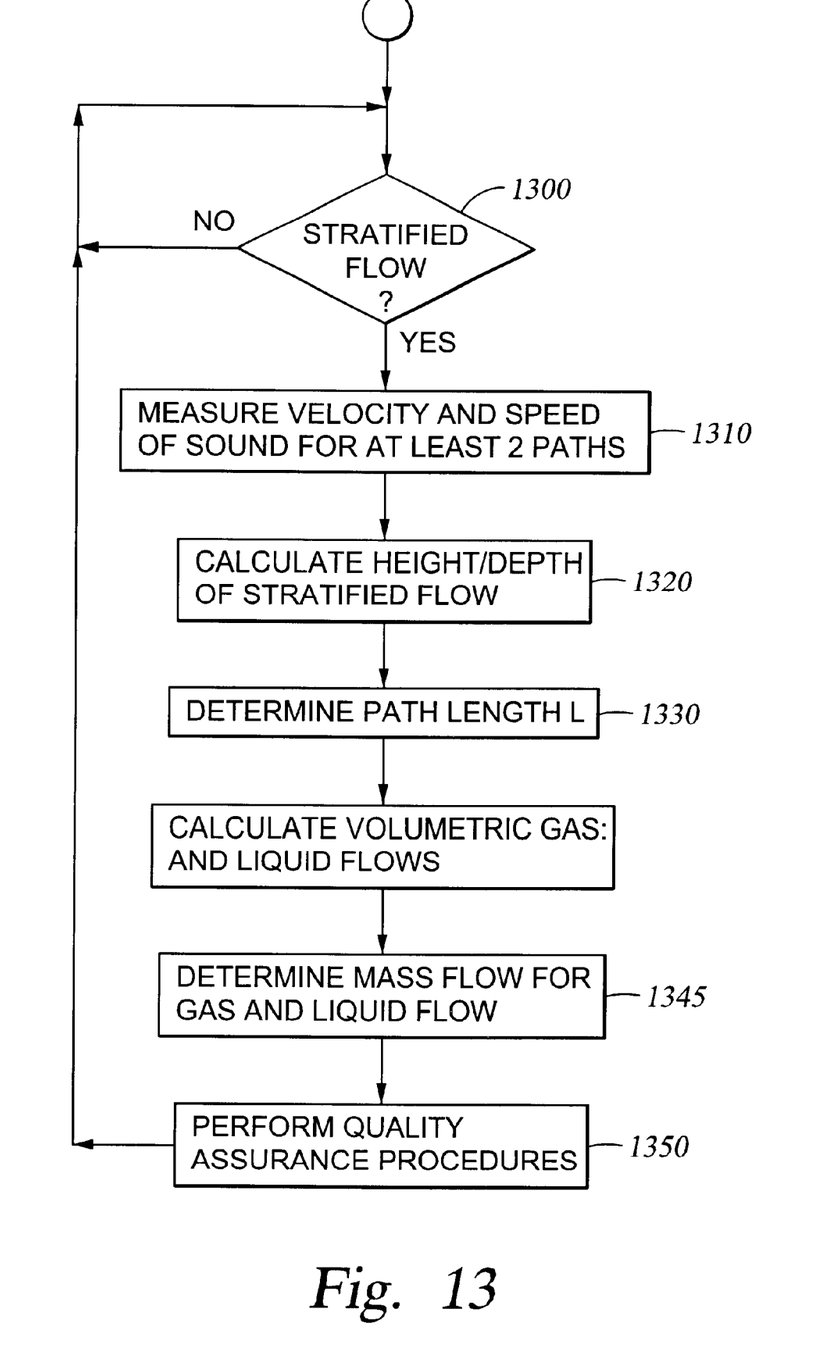
FIG. 13 is a flow diagram illustrating a method according to the invention.

The measurement of the flow rate for the two phases of the fluid may therefore be expressed as a series of steps. Referring to FIG. 13, a detection of liquid stratified flow may be made at step 1300 if liquid transducers are positioned at the bottom of the pipeline. The velocity of gas flow and speed of sound measurements are then taken at step 1310 for at least one ultrasonic path whose speed of sound measurement is dependent on the level of stratified flow and for at least one ultrasonic path whose speed of sound measurement is not dependent on the level of the stratified flow. This includes measurement of the times of flight for upstream and downstream ultrasonic signals. At step 1320, a height (i.e. depth) is determined for the stratified flow (if any) based on the difference between the "actual" speed of sound measurement taken along the ultrasonic: path whose measurements are not dependent on the height of the stratified flow and the "false" speed of sound measurement taken along the ultrasonic path whose measurements are dependent on the height of the stratified flow. Step 1330 includes determining L (the ultrasonic path length) from knowledge of h (the depth of the stratified flow) and X (the axial distance between the transducers). At step 1340, the gas flow and liquid flow are determined. For example, voumetric gas flow =(velocity of gas)×(area of pipeline—area of stratified liquid flow). Volumetric liquid flow =(velocity of the liquid)×(area of the stratified liquid flow). Optional step 1345 is determining the mass flow. The mass flow of a gas or liquid is the (volumetric flow of the gas or liquid)×(the density of the gas or liquid). The density of the gas or liquid can be calculated from the measured speed of sound for that gas or liquid. At step 1350, quality assurance checks may be performed. Of course, not all of these steps need be performed to receive a benefit from the invention. It is also not necessary that they all be performed in the specified order.

Upon understanding of the teachings herein, a processor, computer or other electronics may be programmed to estimate accurately the various components of the two-phase fluid disclosed herein. This processor or the like may be part of an ultrasonic meter or may be separate. This may be the same processor that operates on measured data from an ultrasonic meter, or it can be a different processor or the like.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. For example, many of the examples above assume a liquid stratified flow in a predominantly gas (or gas with mist flow) stream. The system could as easily be adapted to make its measurements on a stratified gas flow in a predominantly liquid stream. The teachings of U.S. Pat. No. 6,151,958 could also be integrated into the design to determine the amount of mist flow traveling through the pipeline. Accordingly, the scope of protection is not limited to the embodiments described herein, but is only limited by the claims which follow, the scope of which shall include all equivalents of the subject matter of the claims.

What is claimed is:

1. An ultrasonic flow meter suitable to carry a stratified flow in a two-phase flow, comprising:
    a first ultrasonic transducer capable of transmitting ultrasonic signals along a first path;
    a second ultrasonic transducer capable of transmitting ultrasonic signals along a second path;
    a third ultrasonic transducer capable of transmitting ultrasonic signals along a third path;
    to said first, second, and third paths being different, wherein said first path traverses a first portion of said two-phase flow generally corresponding to said first phase and reflecting off the surface of said stratified flow, and said second path traverses a second portion of said two-phase flow generally corresponding to said second phase prior to said second path reflecting off the surface of said stratified flow, and said third path remains completely in a single portion of said two-phase flow.

2. The ultrasonic flow meter of claim 1, further comprising a fourth transducer corresponding to said first transducer, a fifth transducer corresponding to said second transducer, and a sixth transducer corresponding to said third transducer.

3. The ultrasonic flow meter of claim 2, further comprising:
    a processor suitable to calculate the velocity, speed of sound, and average density for at least one phase of said two-phase flow.

4. The ultrasonic flow meter of claim 3, wherein said processor further calculates the stratified fluid level for said stratified flow.

5. The ultrasonic flow meter of claim 2, further comprising:
    a processor suitable to calculate the stratified fluid level for said stratified flow, and the velocity, speed of sound, and average density for both of said phases of said two-phase flow.

6. The ultrasonic flow meter of claim 1, wherein said first portion is a predominantly or wholly gaseous and said second portion is predominantly or wholly liquid.

7. The ultrasonic flow meter of claim 1, further comprising:
    a processor attached to said first, second, and third ultrasonic transducers,
    wherein said first portion is a predominantly or wholly gaseous and said second portion is predominantly or wholly liquid and further wherein said processor calculates a height for said surface of said stratified flow based on measurement of time of flight for ultrasonic signals along said first path, said second path and said third path.

8. The ultrasonic flow meter of claim 1, further comprising:
    a processor attached to said first, second, and third ultrasonic transducers,
    wherein said first portion is a predominantly or wholly gaseous and said second portion is predominantly or wholly liquid, and further wherein said processor calculates a height for said surface of said stratified flow based on a calculation of speed of sound for an ultrasonic signal along said first path, said second path, and said third path.

9. A method to determine the characteristics of a two-phase stratified flow through a conduit, comprising:
   a) measuring times of flight for a first set of ultrasonic signals in a first portion of said two-phase flow, said first portion generally corresponding to a first phase of said two-phase flow, said first set of ultrasonic signals not directed to reflect off an interface between said first portion and a second portion that generally corresponds to a second phase of said two-phase flow;
   b) measuring the times of flight for a second set of ultrasonic signals in said first portion, said second set of ultrasonic signals directed to reflect off said interface;
   c) calculating a height for said interface in said conduit based on said measurement of said times of flight for said first set of ultrasonic signals and said second set of ultrasonic signals.

10. The method to claim 9, wherein said phase is a liquid stratified flow.

11. The method according to claim 9, comprising:
   d) measuring times of flight for a third set of ultrasonic signals in said second portion of said two-phase flow.

12. The method of claim 11, further comprising:
   e) calculating flow velocity and speed of sound for said first portion and calculating flow velocity and speed of sound for said second portion.

13. The method of claim 12, further comprising:
   f) determining gas flow and liquid flow for said two-phase flow.

14. The method of claim 12, further comprising:
   f) determining gas volume and liquid volume for said two-phase flow.

15. The method of claim 12, wherein said calculation of flow velocity includes calculation of a path length for said third set of ultrasonic signals.

16. The method of claim 12, further comprising:
   f) checking the accuracy of measurements by the equation:

$$\rho_L V_L^2 = \rho_G [V_G - V_L]^2$$

where,
   $\rho_L$ = density of the liquid
   $\rho_G$ = density of the gas
   $V_L$ = velocity of liquid
   $V_G$ = velocity of gas.

17. The method of claim 12, wherein said height is calculated by differences in said calculated speed of sound for said first set of ultrasonic signals and said calculated speed of sound for said second set of ultrasonic signals.

18. The method of claim 9, further comprising the step of calculating the speed of sound for said first portion.

19. The method of claim 9, further comprising the step of deriving the speed of sound for said first portion and said step of calculating uses said derived speed of sound for said first portion.

20. The method of claim 9, further comprising:
   calculating the speed of sound for said first set of ultrasonic signals;
   calculating the speed of sound for said second set of ultrasonic signals;
   wherein said step of calculating said height of said interface uses both said speed of sound for said first set of ultrasonic signals and said second set of ultrasonic signals.

21. The method of claim 20, wherein said first phase is predominantly or wholly gaseous and said second phase is predominantly or wholly liquid.

22. An ultrasonic flow monitoring system, comprising:
   a first ultrasonic path positioned to travel through a first portion of a fluid flow, said first portion being predominantly a first phase of fluid;
   a second ultrasonic path positioned to reflect from an interface between said first portion and a second portion;
   a processor to calculate the height of said interface based on measurements along said first ultrasonic path and said second ultrasonic path
   wherein said first ultrasonic path is not positioned to bounce off said interface.

23. The ultrasonic flow monitoring system of claim 22, further comprising:
   a third ultrasonic path positioned to travel through said second portion of said fluid flow.

24. The ultrasonic flow monitoring system of claim 23, wherein said system includes a processor to calculate flow velocities and speeds of sound for said first and said second portions.

25. The ultrasonic flow monitoring system of claim 23, wherein said first, second, and third ultrasonic path are all within a single flow meter.

26. The ultrasonic flow monitoring system of claim 22, wherein said system includes a processor to calculate the volume of gas and stratified liquid traveling through a pipeline.

27. The ultrasonic flow monitoring system of claim 22, wherein said system includes a processor to calculate the mass of gas and stratified liquid traveling through a pipeline.

28. The method of claim 22, said second portion being predominantly or wholly a second phase of fluid.

* * * * *